US007525928B2

(12) United States Patent
Cutler

(10) Patent No.: US 7,525,928 B2
(45) Date of Patent: *Apr. 28, 2009

(54) SYSTEM AND PROCESS FOR DISCOVERY OF NETWORK-CONNECTED DEVICES AT REMOTE SITES USING AUDIO-BASED DISCOVERY TECHNIQUES

(75) Inventor: Ross Cutler, Duvall, WA (US)

(73) Assignee: Microsoft Corporation, Redmond, WA (US)

( * ) Notice: Subject to any disclaimer, the term of this patent is extended or adjusted under 35 U.S.C. 154(b) by 925 days.

This patent is subject to a terminal disclaimer.

(21) Appl. No.: 10/869,119

(22) Filed: Jun. 15, 2004

(65) Prior Publication Data

US 2005/0018687 A1     Jan. 27, 2005

Related U.S. Application Data

(63) Continuation-in-part of application No. 10/788,907, filed on Feb. 28, 2004, and a continuation-in-part of application No. 10/462,243, filed on Jun. 16, 2003, now Pat. No. 6,934,370.

(51) Int. Cl.
    *H04L 12/28* (2006.01)
(52) U.S. Cl. .................. 370/254; 709/204
(58) Field of Classification Search ............ 370/241, 370/260–271, 346, 395.2, 449, 254, 276–278, 370/313; 713/168, 176; 709/204
    See application file for complete search history.

(56) References Cited

U.S. PATENT DOCUMENTS

| 3,790,717 | A | * | 2/1974 | Abramson et al. .......... 370/431 |
| 5,539,483 | A |   | 7/1996 | Nalwa |
| 5,745,305 | A |   | 4/1998 | Nalwa |
| 5,793,527 | A |   | 8/1998 | Nalwa |
| 5,990,934 | A |   | 11/1999 | Nalwa |
| 6,005,611 | A |   | 12/1999 | Gullichsen et al. |
| 6,043,837 | A |   | 3/2000 | Driscoll, Jr. et al. |
| 6,061,793 | A | * | 5/2000 | Tewfik et al. ............... 713/176 |
| 6,111,702 | A |   | 8/2000 | Nalwa |
| 6,115,176 | A |   | 9/2000 | Nalwa |
| 6,128,143 | A |   | 10/2000 | Nalwa |

(Continued)

OTHER PUBLICATIONS

Timothy J. Weidner, Office Action, U.S. Appl. No. 10/788,907, mailing date Aug. 31, 2007.

(Continued)

*Primary Examiner*—Ricky Ngo
*Assistant Examiner*—Kan Yuen
(74) *Attorney, Agent, or Firm*—Lyon & Harr, LLP; Richard T Lyon

(57) ABSTRACT

A system and process for discovery between endpoint components and computing devices residing at remote locations from each other, in cases where the devices are connected to a common computer network, is presented. The present invention allows a device in one location to discover the network address of another device at a different location, which then allows the first device to negotiate with the discovered device to facilitate the transfer of data and other communications over the common network. However, this discovery is accomplished without the use of the common network. Rather the discovery process uses audible or inaudible audio signals transferred between the devices at two different locations using a communication medium, such as a telephone system.

38 Claims, 6 Drawing Sheets

U.S. PATENT DOCUMENTS

| | | |
|---|---|---|
| 6,141,145 A | 10/2000 | Nalwa |
| 6,144,501 A | 11/2000 | Nalwa |
| 6,175,454 B1 | 1/2001 | Hoogland et al. |
| 6,195,204 B1 | 2/2001 | Nalwa |
| 6,219,089 B1 | 4/2001 | Driscoll, Jr. et al. |
| 6,219,090 B1 | 4/2001 | Nalwa |
| 6,222,683 B1 | 4/2001 | Hoogland et al. |
| 6,285,365 B1 | 9/2001 | Nalwa |
| 6,313,865 B1 | 11/2001 | Driscoll, Jr. et al. |
| 6,331,869 B1 | 12/2001 | Furlan et al. |
| 6,337,708 B1 | 1/2002 | Furlan et al. |
| 6,341,044 B1 | 1/2002 | Driscoll, Jr. et al. |
| 6,346,967 B1 | 2/2002 | Gullichsen et al. |
| 6,356,296 B1 | 3/2002 | Driscoll, Jr. et al. |
| 6,356,397 B1 | 3/2002 | Nalwa |
| 6,369,818 B1 | 4/2002 | Hoffman et al. |
| 6,373,642 B1 | 4/2002 | Wallerstein et al. |
| 6,388,820 B1 | 5/2002 | Wallerstein et al. |
| 6,392,687 B1 | 5/2002 | Driscoll, Jr. et al. |
| 6,424,377 B1 | 7/2002 | Driscoll, Jr. et al. |
| 6,426,774 B1 | 7/2002 | Driscoll, Jr. et al. |
| 6,459,451 B2 | 10/2002 | Driscoll, Jr. et al. |
| 6,466,254 B1 | 10/2002 | Furlan et al. |
| 6,480,229 B1 | 11/2002 | Driscoll, Jr. et al. |
| 6,493,032 B1 | 12/2002 | Wallerstein et al. |
| 6,515,696 B1 | 2/2003 | Driscoll, Jr. et al. |
| 6,539,547 B2 | 3/2003 | Driscoll, Jr. et al. |
| 6,583,815 B1 | 6/2003 | Driscoll, Jr. et al. |
| 6,593,969 B1 | 7/2003 | Driscoll, Jr. et al. |
| 6,597,520 B2 | 7/2003 | Wallerstein et al. |
| 6,700,711 B2 | 3/2004 | Nalwa |
| 6,741,250 B1 | 5/2004 | Furlan et al. |
| 6,756,990 B2 | 6/2004 | Koller |
| 6,885,509 B2 | 4/2005 | Wallerstein et al. |
| 6,909,705 B1 * | 6/2005 | Lee et al. ............ 370/338 |
| 6,924,832 B1 | 8/2005 | Shiffer et al. |
| 2002/0034020 A1 | 3/2002 | Wallerstein et al. |
| 2002/0063802 A1 | 5/2002 | Gullichsen et al. |
| 2002/0071440 A1 * | 6/2002 | Cerami et al. ............ 370/404 |
| 2002/0080800 A1 * | 6/2002 | Lee et al. ............ 370/395.54 |
| 2002/0094132 A1 | 7/2002 | Hoffman et al. |
| 2002/0152314 A1 * | 10/2002 | Hayek et al. ............ 709/227 |
| 2002/0154417 A1 | 10/2002 | Wallerstein et al. |
| 2003/0095521 A1 * | 5/2003 | Haller et al. ............ 370/338 |
| 2003/0142402 A1 | 7/2003 | Carbo, Jr. et al. |
| 2003/0149874 A1 * | 8/2003 | Balfanz et al. ............ 713/168 |
| 2003/0193606 A1 | 10/2003 | Driscoll et al. |
| 2003/0193607 A1 | 10/2003 | Driscoll et al. |
| 2004/0003051 A1 * | 1/2004 | Krzyzanowski et al. ..... 709/217 |
| 2004/0008407 A1 | 1/2004 | Wallerstein et al. |
| 2004/0008423 A1 | 1/2004 | Driscoll, Jr. et al. |
| 2004/0021764 A1 | 2/2004 | Driscoll, Jr. et al. |
| 2004/0022272 A1 * | 2/2004 | Rodman et al. ............ 370/494 |
| 2004/0133704 A1 * | 7/2004 | Krzyzanowski et al. ..... 709/250 |
| 2004/0196825 A1 * | 10/2004 | Scholte ............ 370/351 |
| 2004/0213274 A1 * | 10/2004 | Fan et al. ............ 370/401 |
| 2004/0252384 A1 | 12/2004 | Wallerstein et al. |
| 2004/0254982 A1 | 12/2004 | Hoffman et al. |
| 2006/0143458 A1 * | 6/2006 | Tie et al. ............ 713/176 |

OTHER PUBLICATIONS

Timothy J. Weidner, Office Action, U.S. Appl. No. 10/788,907, mailing date Jan. 7, 2008.

Series V: Data communcation over the telephone network, International Telecommunication Union, Aug. 1996.

Kirovaski, D, H. S. Malvar, Spread-spectrum watermarking of audio signals, *IEEE Trans. on Sig. Proc.*, Apr. 2003, vol. 51, No. 4, pp. 1030-1033.

\* cited by examiner

SYSTEM AND PROCESS FOR DISCOVERY OF NETWORK-CONNECTED DEVICES AT REMOTE SITES USING AUDIO-BASED DISCOVERY TECHNIQUES

CROSS-REFERENCE TO RELATED APPLICATIONS

This application is a continuation-in-part of a prior application entitled "A System And Process For Discovery Of Network-Connected Devices" which was assigned Ser. No. 10/788,907 and filed Feb. 28, 2004. This application is also a continuation-in-part of a prior application entitled "System And Method For Communicating Audio Data Signals Via An Audio Communications Medium" which was assigned Ser. No. 10/462,243 and filed Jun. 16, 2003 now U.S. Pat. No. 6,934,370.

BACKGROUND

1. Technical Field

The invention is related to discovery among network-connected devices, and more particularly to a system and process for a discovering electronic device to discover the network address of a discoverable electronic device connected to the same network and located at a remote site, using audio-based discovery techniques in lieu of employing the network.

2. Background Art

Communication between electronic devices connected via a local network is a common requirement in a variety of applications, such as found in ubiquitous computing environments and some teleconferencing systems. For example, ubiquitous computing revolves around extending computational activities beyond the current desktop model and into the environment. In future homes and offices, access to computing should be as natural as access to lighting. Users should not be required to go to a special place (i.e., the desktop) to interact with the computer. Rather, the computer should be available to interface with the user anywhere in the home or office (or more generally anywhere in an arbitrarily large environment), through whatever set of devices is available, be they fixed or carried by the user. In order to affect this ubiquitous computing environment the various endpoint components and computing devices (hereinafter referred to collectively as devices) need to communicate with each other. One typical way this is accomplished is via communication over a computer network. This can be done either using wired or wireless connection schemes.

In the context of teleconferencing, meetings are an important part of everyday life for many workgroups. A variety of live teleconferencing systems are available commercially to enhance and archive these meetings. Both recorded meetings and live video conferences require audio-visual capturing equipment. One such system generally referred to as a Distributed Meetings (DM) system provides high quality multi-party conferencing and recording of meetings, as well as rich browsing of archived meetings enhanced through a number of analysis techniques. DM systems typically have multiple endpoint devices such as various cameras that simultaneously capture different sub-events occurring in a space where an event occurs, such as a meeting room, to give a rich experience to local and remote meeting participants. These capture devices are all synchronized to provide an integrated, scalable system and method for two-way conferencing, broadcasting, recording and viewing meetings or other events. In particular, a DM system's cameras can include a 360-degree camera centrally positioned to monitor in 360 degrees the space in which the event occurs; a remote view camera positioned so as to capture a view of event participants in the meeting room; a presenter view camera positioned so as to capture a view of the front of the meeting room where a presenter is typically presenting; and a whiteboard capture camera positioned so as to capture strokes written on a whiteboard. A DM system also typically has one or more microphone devices or microphone arrays that simultaneously capture audio data that is synchronized with the image data recorded by the various cameras. A given microphone device or array can be used to determine the direction from which an event participant is speaking by using sound source localization. The 360 degree camera, presenter view camera and remote view camera all can have microphone arrays associated with them. A DM system can also include a projector for projecting meeting or other materials onto a screen and a graphics capture device is used to capture graphics data used in the meeting, such as electronic slides that are part of an electronic presentation. A monitor or television may also be included to display one or more remote participants or other meeting/event materials. Further, a DM system also can have a kiosk that is used to control broadcast, recording and playback of the meeting or other event. In addition, at least one server or other suitably configured computer that is capable of storing and distributing the captured data to one or more clients in network connection with the server can be included.

For live meetings using a DM system, the system broadcasts the multimedia meeting streams to participants, who use a network for low-latency duplex voice and data communication. The meetings can also be recorded and viewed on-demand.

Thus, in a DM scenario there are many different devices that must communicate with each other. One effective way of accomplishing this task is to connect all the devices to a computer network. Here again, this can be done either using wired or wireless connection schemes.

However, in the foregoing scenarios the various devices that are located at remote locations from each other will not know of each others existence. Accordingly, a key to establishing communications between devices over a network is for the devices to discover each other. Once a connection is established, a device can control or be controlled by other devices, send or receive event signals, and transfer data between applications.

Universal Plug and Play (UPnP) is a standard framework that enables discovery between components and devices connected to a network, and is the typical method for establishing communications. In general, this framework typically requires a device to multicast its address over the network. Other components or devices seeking communication with the multicasting device would then use the address to establish communications. However, this method of discovery presents serious security issues. For example, unless potentially elaborate security measures are taken, unauthorized access to a device is a possibility using the standard UPnP discovery methods. In addition, the multicast feature is expensive in terms of network bandwidth. As a result of these concerns, among others, businesses often disable the multicast feature. Thus, there is no way for devices to discover each other and so the advantages of UPnP cannot be realized.

Thus, there is a need for alternate discovery techniques for endpoint components and computing devices, at remote locations from each other, to establish communications over a network. In addition, there is a need for alternate discovery techniques that can be combined with UPnP to allow UPnP to work even in environments with the multicast capability disabled.

SUMMARY

The present invention is directed toward a system and process for discovery between endpoint components and computing devices (hereinafter referred to collectively as devices) residing at remote locations from each other, in cases where the devices are connected to a common computer network. The present invention allows a device in one location to discover the network address of another device at a different location, which then allows the first device to negotiate with the discovered device to facilitate the transfer of data and other communications over the common network. However, unlike prior schemes this discovery is accomplished without the use of the common network. Rather the discovery process uses audio signals transferred between the devices at two different locations using a communication medium. Thus, this communication medium-based discovery system is not affected by the disablement of the multicast feature typically employed for discovery purpose over a computer network. It is noted that the aforementioned "network address" is used generically in that it can mean any computer network identifier such as an identifier for a computer or device on a TCP/IP network (i.e., an IP address), a Session Initiation Protocol (SIP) address, or a Uniform Resource Locator (URL), among others.

In one embodiment of the present discovery system and process, a discovering device at one location receives an audio signal transmitted by a discoverable electronic device at another location over the communication medium. This audio signal includes data representing the address assigned to the discoverable device on the common network. Once the discovering device has the discoverable device's network address it can act to establish communications via the common network.

In another embodiment of the present discovery system and process the discovering device at a first location receives a signature signal transmitted by a discoverable electronic device at a second, remote location. This signature signal, in its simplest form, indicates the discoverable device is present at the remote location and is accessible via a common computer network. The discovering device can respond to the signature signal by transmitting a request signal back to the discoverable electronic device over the communications medium. This request signal, at a minimum, requests that the address assigned to that discoverable device on the common network be transmitted to the discovering device. In response to the request signal, the discoverable device can transmit a reply signal over the communications medium that is received by the discovering device. This reply signal includes data representing the requested network address.

In yet another embodiment of the present discovery system and process, it is the discovering device that initiates discovery by transmitting a request signal over the communications medium. This signal includes a request that the network address assigned to a discoverable device be transmitted back to the discovering device. In response, the discoverable device can transmit the requested reply in the form of an audio signal that includes the aforementioned data representing its network address. Both the request and reply signals are transferred between the devices over the communications medium.

The aforementioned audio signals exchanged between the discovering and discoverable devices can be audible or inaudible. If an inaudible signal is employed, it can be a low amplitude audio signal inaudible to humans that has data embedded in it in the form a conventional audio watermark. In this case the receiving device obtains the desired data by ascertaining the content of the audio watermark. If an audible signal is employed, the data is encoded in the signal using any appropriate conventional audio encoding scheme, and the receiving device obtains the desired data by decoding the signal using the appropriate decoding scheme. It is further noted that the audio signals can be encrypted for security purposes using any appropriate conventional encryption scheme. In such a case the device receiving the signal would decrypt it prior to obtaining the desired data.

The aforementioned communications medium can be any capable of transmitting audio signals between remote locations, such as a telephone communication system. The communication medium is terminated at the locations where the discoverable and discovering devices reside by communication devices such as telephones, speakerphones (or devices capable of acting as a speakerphone), cell phones, PBXs, and the like. In one embodiment of the present system and process, these communication devices have microphones for receiving audio signals from the air and speakers for broadcasting audio signals through the air. The communication devices can also have direct connection interfaces for feeding an audio signal directly to a discoverable or discovering device, and for receiving an audio signal directly from these devices. Likewise, the discovering and discoverable devices can be equipped with a microphone and speaker, or direct communication interfaces, or both.

In general, the communication device at each location receives the audio signals generated and disseminated by the discovering or discoverable device at that location (either by broadcasting them into the location using its speaker or via a direct connection to the communication device). The communication device also disseminates the audio signals received over the communication system from another location either by broadcasting into the location or via a direct connection to the discovering or discoverable device at that location. In the case where the audio signals are being broadcast by a communication device into a location, they are picked up by the discovering or discoverable device residing in that location via its microphone.

In addition to the just described benefits, other advantages of the present invention will become apparent from the detailed description which follows hereinafter when taken in conjunction with the drawing figures which accompany it.

DESCRIPTION OF THE DRAWINGS

The specific features, aspects, and advantages of the present invention will become better understood with regard to the following description, appended claims, and accompanying drawings where:

DETAILED DESCRIPTION OF THE PREFERRED EMBODIMENTS

In the following description of preferred embodiments of the present invention, reference is made to the accompanying drawings which form a part hereof, and in which is shown by way of illustration specific embodiments in which the invention may be practiced. It is understood that other embodiments may be utilized and structural changes may be made without departing from the scope of the present invention.

1.0 The Computing Environment

Figure 1:
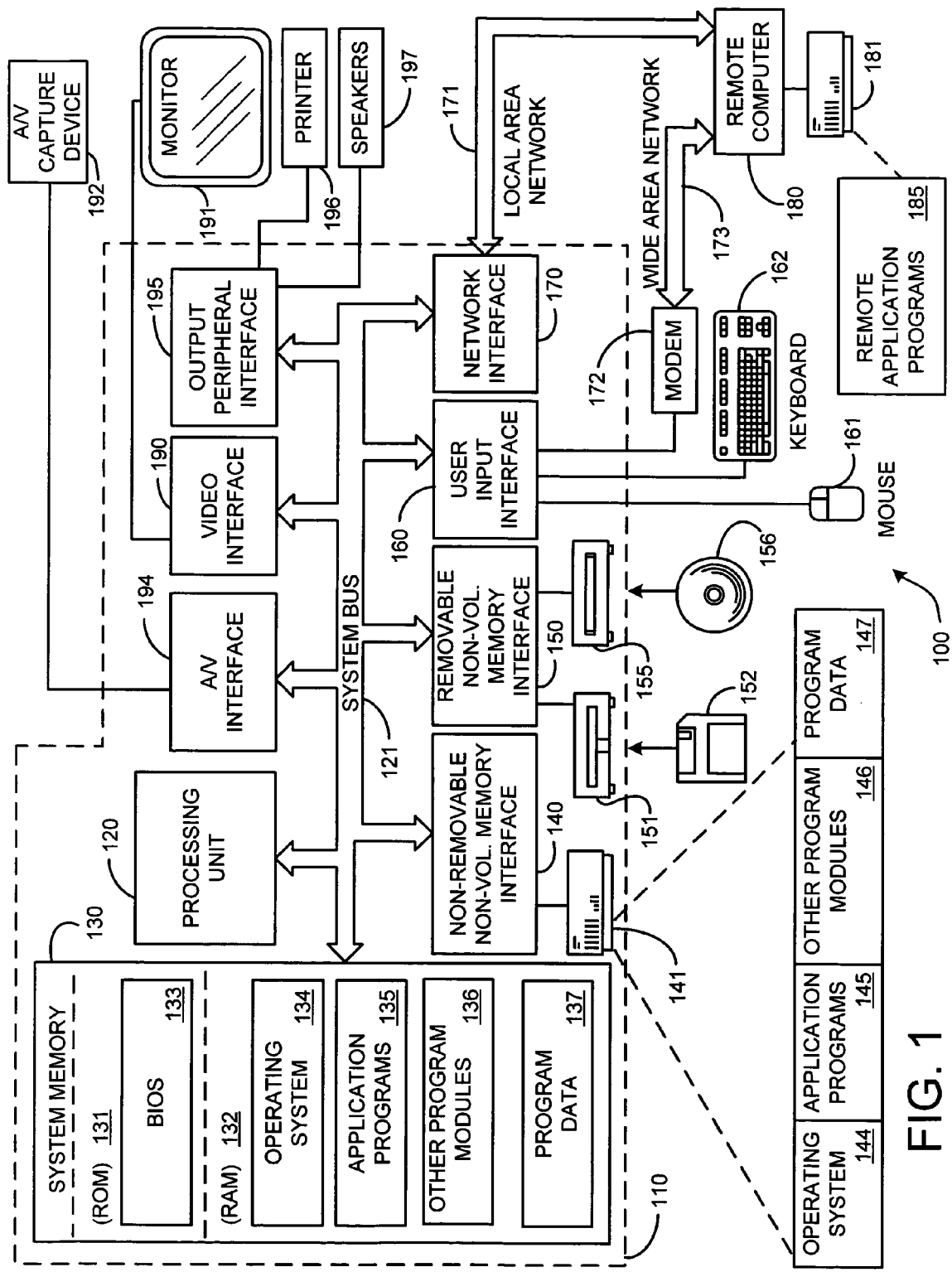
FIG. 1 is a diagram depicting a general purpose computing device constituting an exemplary system for implementing the present invention.

Before providing a description of the preferred embodiments of the present invention, a brief, general description of a suitable computing environment in which the invention may be implemented will be described. FIG. 1 illustrates an example of a suitable computing system environment 100. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/ nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195. An audio/video (AN) capture device 192 (such as a camera of the previously described DM system) can also be included as an input device to the personal computer 110. The AN output from the device 192 is input into the computer 110 via an appropriate AN interface 194. This interface 194 is connected to the system bus 121, thereby allowing the images to be routed to and stored in the RAM 132, or one of the other data storage devices associated with the computer 110.

The computer 110 operates in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181.

It will be appreciated that the network connections shown are exemplary and other means of establishing a communications link between the computers may be used.

2.0 System and Process for Discovering Networked Endpoint Components and Computing Devices via a Communication Medium The exemplary operating environment having now been discussed, the remaining part of this description section will be devoted to a description of the program modules embodying the invention. Generally, the system and process according to the present invention involves discovery between endpoint components and computing devices (hereinafter referred to collectively as devices) located at remote locations from each other, in cases where the devices are connected to the same computer network. As described previously, discovery is the first step in order for two devices to communicate. More particularly, the present invention allows a device at one location to discover the network address of another device at another, remote location, which then allows the first device (or a computer associated with the first device) to negotiate with the discovered device (or a computer associated with the discovered device) for data transfer, control, and so on. This network connection can be an intranet, enterprise-wide network, LAN, WAN, or Internet via a wireless or wired connection. It is noted that the aforementioned "network address" is used generically in that it can mean any computer network identifier such as an identifier for a computer or device on a TCP/IP network (i.e., an IP address), a Session Initiation Protocol (SIP) address, or a Uniform Resource Locator (URL), among others. The data required to discover a remote device is transferred via audio signals. More particularly, the data is encoded into the audio signals as beeps, tones, spectrum modulation, audio watermarks, white noise, and volume changes, among others.

In order for a device being discovered, as well as the device performing the discovery, to send and receive the aforementioned audio signals, each is configured to include a loudspeaker and microphone (which can be one of the aforementioned microphone arrays employed in DM systems). It is noted that most portable PC devices already have these items, and they can be readily incorporated into any endpoint component. A direct connection interface capable of receiving and sending audio signals can also be employed. Examples of such interfaces include microphone and headphone jacks, USB connectors, 1394 connectors, and serial or parallel ports, among others.

Transfer of the audio signals between the locations where the discovering and discoverable devices reside is accomplished via a communication medium. The communications medium can be any capable of transmitting audio signals between remote locations, such as a telephone communication system. For example, the communication system can be an analog telephone connection, a digital telephone connection, a wireless telephone connection, or combination telephone connection, among others. These connections are terminated at the locations where the discoverable and discovering devices reside by communication devices such as telephones, speakerphones (or devices capable of acting as a speakerphone), cell phones, PBXs, and the like. In one embodiment of the present system and process, these communication devices have microphones for receiving audio signals from the air and speakers for broadcasting audio signals through the air. The communication devices can also have direct connection interfaces for feeding an audio signal directly to a discoverable or discovering device, and for receiving an audio signal directly from these devices. In general, the communication device at each location receives the audio signals generated and disseminated by the discovering or discoverable device at that location (either by broadcasting them into the location using its speaker or via a direct connection to the communication device). The communication device also disseminates the audio signals received over the communication system from another location either by broadcasting into the location or via a direct connection to the discovering or discoverable device at that location. In the case where the audio signals are being broadcast by a communication device into a location, they are picked up by the discovering or discoverable device residing in that location via its microphone.

2.1 Exemplary Configurations

Figure 2:
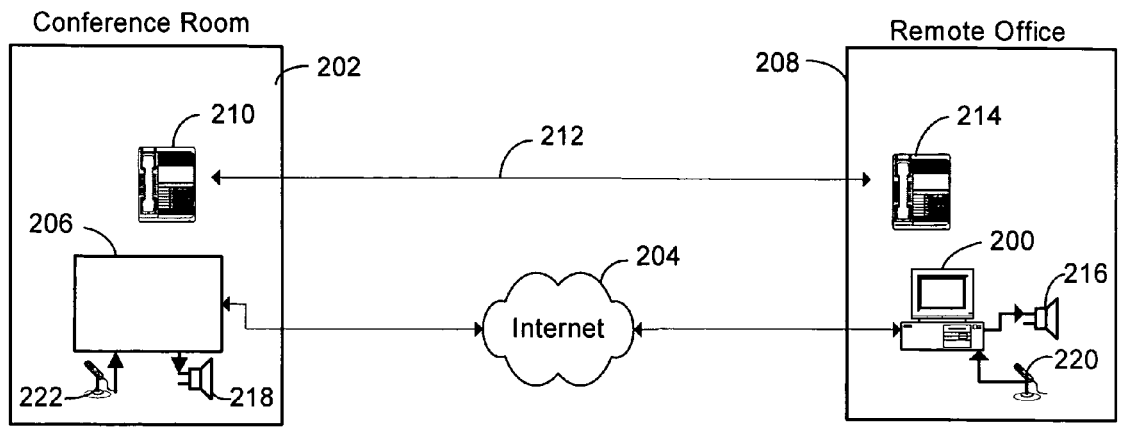
FIG. 2 is a block diagram illustrating an exemplary configuration for implementing one embodiment of the present communication medium-based discovery technique in which audio signals broadcast by devices in respective remote locations are transferred between the locations via speakerphones.

An example of the foregoing communication medium-based discovery system and process is shown in FIG. 2. In this example, a user in a conference room where a meeting is taking place wants a participant at a remote location with access to the Internet to join in the meeting via the previously described DM system. To accomplish this, the remote participant's computer 200 must discover one or more of the endpoint components 206 residing in the conference room 202 that are accessible via the Internet 204. The user calls the remote location (e.g., the participant's office 208) using a speakerphone 210 residing in the conference room 202 over a telephone connection 212. The remote participant answers the call with a speakerphone 214 resident at the remote location 208. The caller can talk with the remote user via the speakerphones 210, 214 at this point to, for example, invite him or her to join in the meeting. Then, employing one of the audio-based discovery techniques that will be described shortly, either the endpoint device 206 in the conference room 202 or the participant's computer 200 at the remote location 208 initiates the discovery process by generating an audio signal encoded with discovery information. This may be automatic, such that the discovering or discoverable device periodically sends out the information needed to initiate the discovery process. Alternately, the generation of the initiating discovery information can be precipitated by a user at the site where the discoverable or discovering device resides.

Next, the initiating discovery information generated by either the discovering or discoverable device 200, 206 is picked up by the speakerphone 210, 214 at the device's location. This is done by either the device 200, 206 playing an audio signal containing the discovery information using its speaker 216, 218, which is then picked up by the microphone of the speakerphone 210, 214, or by sending the audio signal to the speakerphone via the aforementioned direct connection (not shown). The audio signal containing the encoded initiating discovery information is transferred via the telephone connection 212 to the speakerphone 210, 214 associated with the device 200, 206 not initiating the discover process. It is then transferred to the device 200, 206 at that location 202, 208 through the air via the phone's speaker 216, 218 and picked up by the device's microphone 220, 222, or via a direct connection (not shown). The device 200, 206 receiving the signal then decodes it to extract the initiating discovery information, and act on it. In some embodiments of the present system and process the receiving device will be the discovering device 200 and will have enough information at this point to establish a connection to the device 206 at the other site 202 (via the Internet 204 in this example). In other embodiments, additional information is needed by one or the other of the devices 200, 206 to establish the network connection, and so requests for additional discovery information can be exchanged in the same way via the telephone connection 212 in either direction until the discovering device 200 has enough information to make the network connection to the discoverable device 206. Once enough information is received by the discovering device 200, the speakerphone connection could be terminated, or retained for further voice or data communications between the locations 202, 208 involved.

Figure 3:
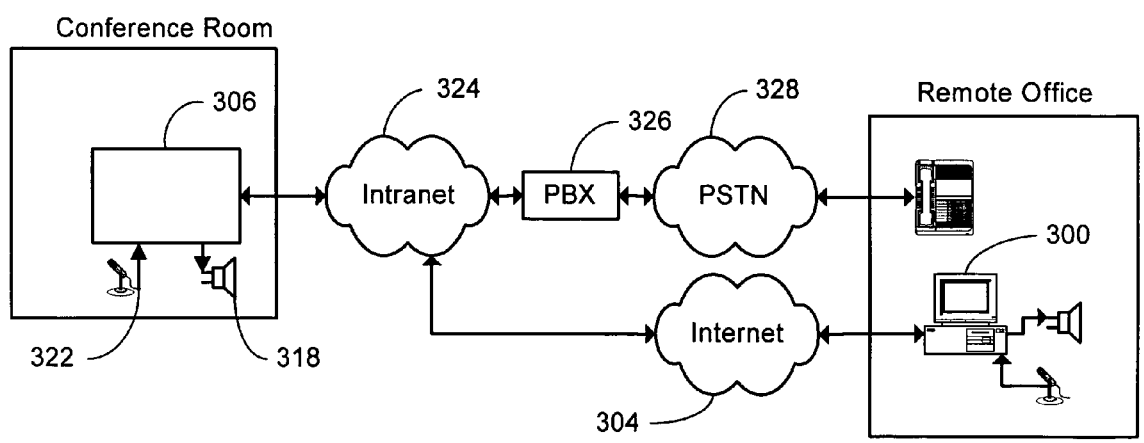
FIG. 3 is a block diagram illustrating an exemplary configuration for implementing another embodiment of the present communication medium-based discovery technique in which audio signals generated by devices in respective remote locations are transferred from one location via a local intranet and PBX through a PSTN and in the other location via a speakerphone through the PSTN.

A variation of the foregoing example is shown in FIG. 3. In this variation, the set up and operation is the same as described above, except that the speakerphone function is taken over by a version of an endpoint device 306 (such as the aforementioned 360 degree camera) that includes a microphone array 322 and speaker 318, and which can act as a speakerphone. In the example shown, the endpoint device 306 is connected to a local intranet 324 to send and receive audio signals through a local PBX 326 via a standard PSTN 328. Alternately, the endpoint device could use IP to transmit audio (e.g., VoIP) via the Internet (not shown). Once the discover information needed to establish communications between the device 306 and the device at the remote location (which is a PC 300 in the example shown) over the Internet 304 have been obtained, these communications are routed through the local intranet 324 to which the device 306 is connected.

Figure 4:
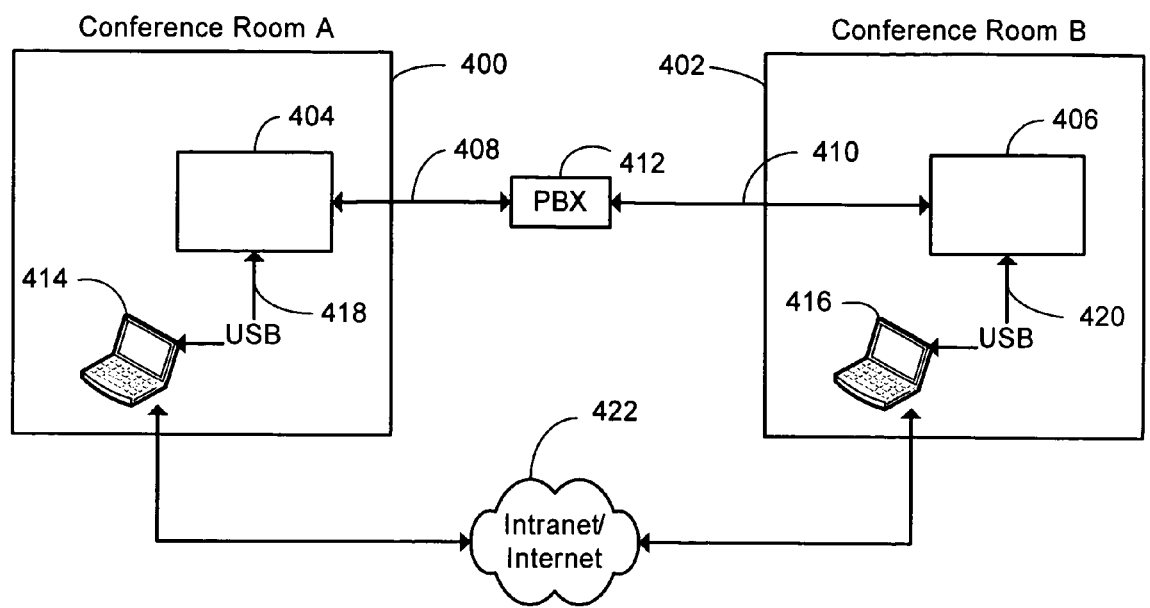
FIG. 4 is a block diagram illustrating an exemplary configuration for implementing yet another embodiment of the present communication medium-based discovery technique in which audio signals generated by devices in respective remote locations are fed directly to a local PBX common to both locations.

Another example of the present communication medium-based discovery system and process is shown in FIG. 4. In this example a user in conference room A 400 is scheduled to have a meeting with participants in conference room B 402. These two conference rooms 400, 402 both have the aforementioned endpoint devices 404, 406 with speakerphone capability, and are configured such that each device can contact the other (in their role as speakerphones) via a direct connection 408, 410 to a local PBX 412. In addition, both conference rooms 400, 402 have a computer 414, 416 connected to its co-located endpoint device 404, 406 via a USB connection 418, 420. This connection 418, 420 allows data to be exchanged between each co-located device 404, 406 and computer 414, 416 at the respective locations 400, 402.

In this example, it will be assumed that the discovering device is endpoint device 404, and its co-located computer 414 establishes communications over a shared network (e.g., a local intranet or the Internet 422) with the computer 416 in the other conference room 402. Given this assumption, the user in conference room A 400 calls conference room B 402 via the PBX 412, using the endpoint device 404 as a speakerphone. A user in conference room B 402 answers the call with its endpoint device 406. At this point, the caller can talk with the user in conference room B 402, if desired. Next, employing one of the aforementioned discovery techniques that will be described shortly, the endpoint device 404, 406 in one of the conference rooms initiates the discovery process by generating an audio signal encoded with discovery information. This may be automatic, or precipitated by a user. In this example the audio signals are sent and received by each of the endpoint devices 404, 406 via a direct connection 408, 410 to the local PBX 412.

The initiating discovery information generated by either the discovering or discoverable device is picked up by the other endpoint device. The device receiving the signal then decodes it to extract the initiating discovery information, and act on it. As indicated previously, in some embodiments of the present system and process the receiving device will have received enough information at this point to facilitate establishing a connection to the device at the other site (via the computers at each site over an intranet in this example). In other embodiments, additional information is needed to establish the network connection, and so requests and additional discovery information can be exchanged in the same way via the telephone connection in either direction until the enough information to make the network connection is received by the computer connected to the discovering device. The telephone connection between the endpoint devices can be terminated at this point, or retained for further voice or data communications between the locations.

2.2 Audio-Based Discovery Techniques

Figure 5:
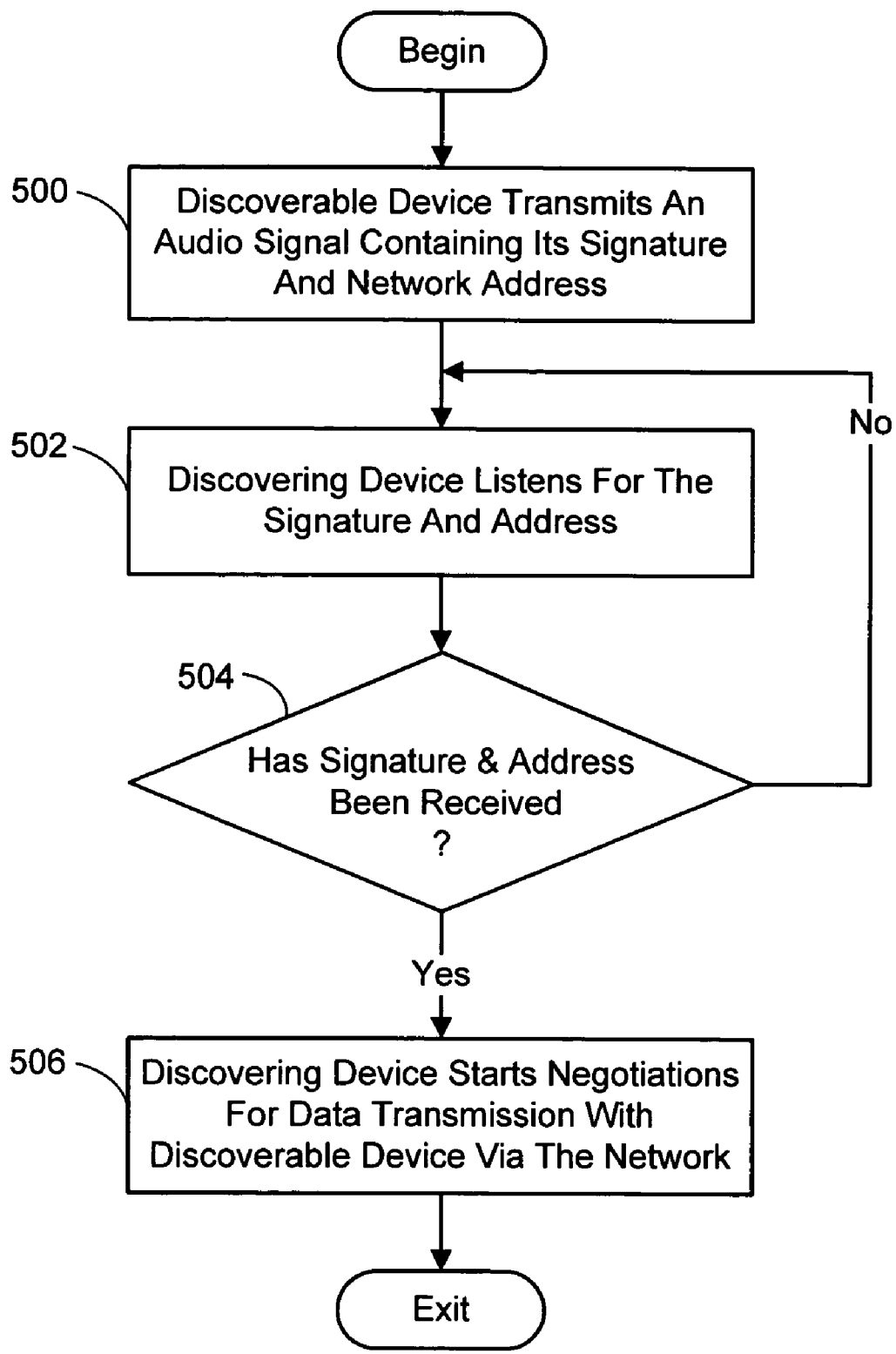
FIG. 5 is a flow chart diagramming an exemplary process for implementing one embodiment of the present communication medium-based discovery technique using audio signals.

Referring to FIG. 5, an example of an audio-based discovery technique for use with the foregoing communication medium-based discovery system and process is provided. This technique involves first establishing audio communications between the locations where the discoverable and discovering devices reside over the aforementioned communication medium, as described previously. Once connected, the discovery process can take several forms. One such form involves a discoverable device transmitting an audio signal containing its signature and network address (process action 500) to a discovering device at a remote site in one of the ways described previously. An endpoint component or computing device located at the remote site listens for the signature and address (process action 502). When it is determined that this information has been received (process action 504), the discovering device (or a computer associated therewith) starts negotiations for data transmission (e.g., UPnP, T.120, H.323, or web conferencing URL) via a network common to the discovering and discoverable devices (process action 506). It is noted that the signature of a device can indicate several things such as the type of device, what network it or its associated computer is connected to, and simply that the device is present at a location. While the latter two items can be assumed to be inherent in the fact that a device is transmitting a signature, the first item can require that some unique identifier be used that distinguishes the device from all other discoverable devices. Ideally, the unique identifier representing a device's signature would be made as small as possible, and a prescribed list of identifiers each identifying its corresponding device would be known to all the devices capable of discovering other devices.

Figure 6:
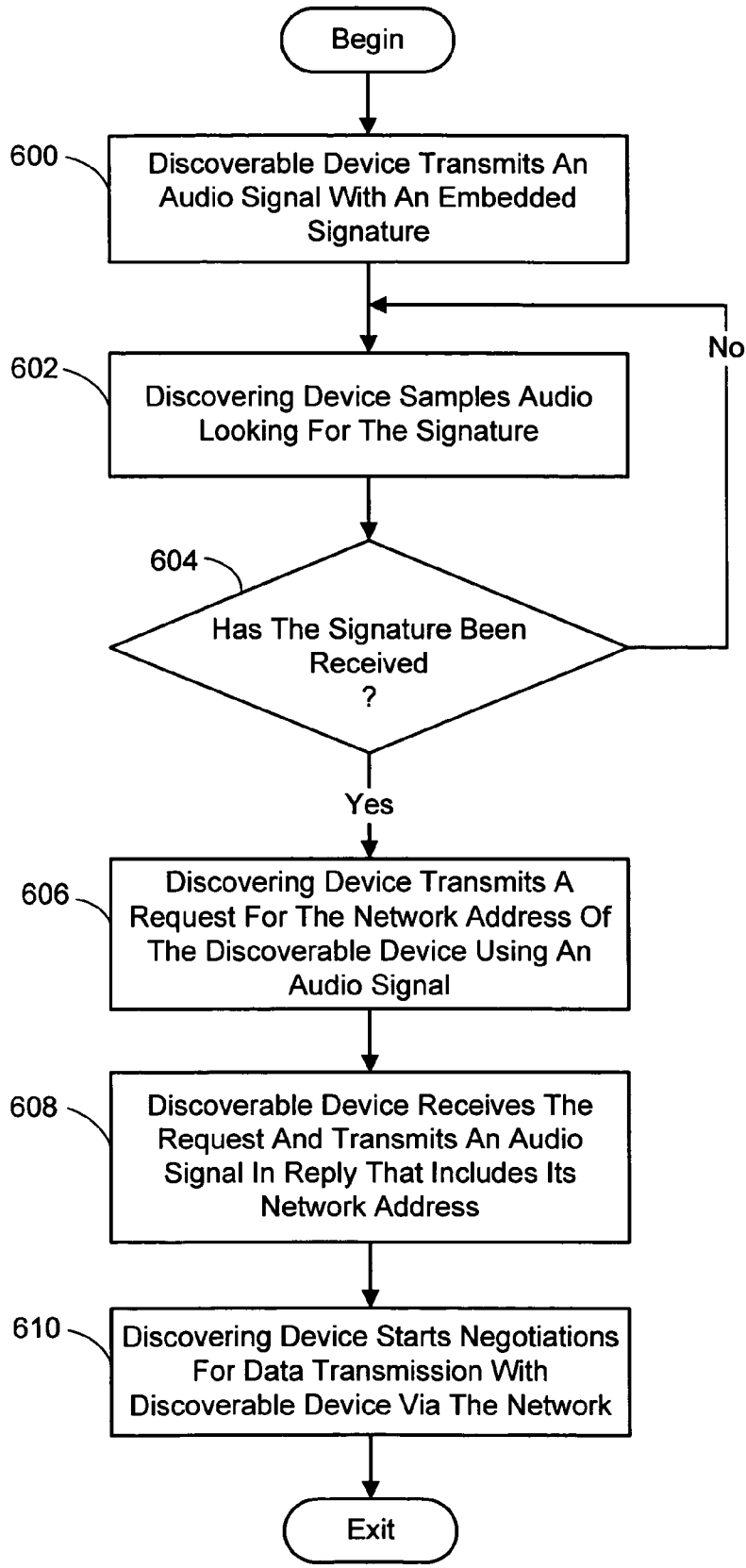
FIG. 6 is a flow chart diagramming an exemplary process for implementing another embodiment of the present communication medium-based discovery technique using audio signals.

Referring to FIG. 6, another example of an audio-based discovery technique for use with the foregoing communication medium-based discovery system and process is provided. This second technique involves first having the device that is to be discovered transmit an audio signal which has an embedded signature in one of the ways described previously (process action 600). The discovering device at the other location receives and samples audio looking for the signature (process action 602). When it is determined that the signature has been received (process action 604), the discovering device transmits an audio signal encoded with a request for the network address of the device being discovered back to the discoverable device (process action 606). The device being discovered then receives the request and transmits a signal in reply that includes its network address in encoded form (process action 608). The discovering device next starts negotiations for data transmission (e.g., UPnP, T.120, H.323, or web conferencing URL) via a network that each of the devices is connected to using the received address (process action 610). It is noted that the signature transmitted by the device being discovered would have the same attributes as the one employed in the previously-described first discovery technique.

Figure 7:
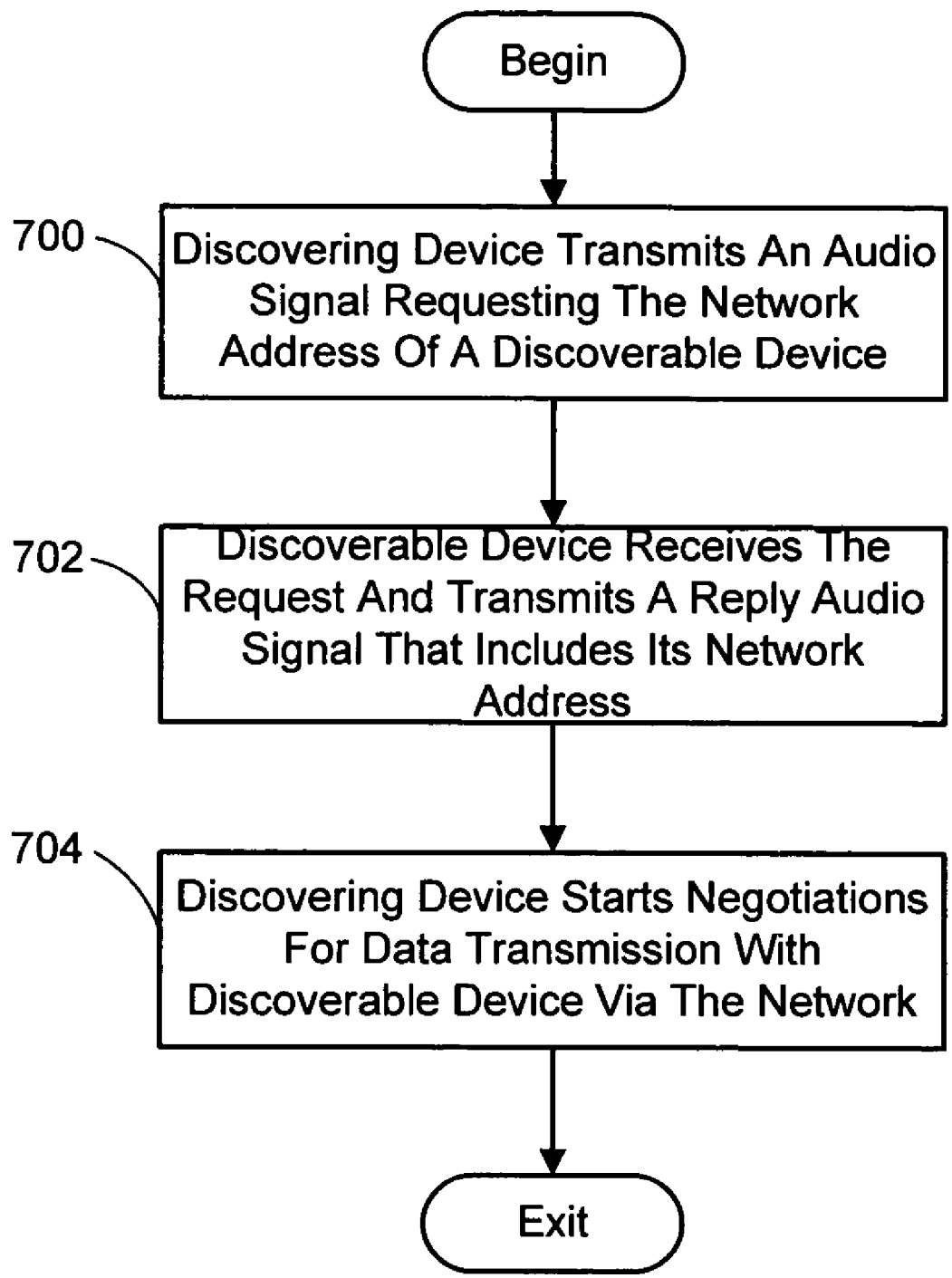
FIG. 7 is a flow chart diagramming an exemplary process for implementing yet another embodiment of the present communication medium-based discovery technique using audio signals.

While the foregoing audio-based discovery techniques involved a discoverable device initiating discovery by transmitting its signature (and in some cases its network address as well), an alternate discovery embodiment would be for the discovering device to initially transmit a request for a network address instead. Referring to FIG. 7, in this alternate scenario, the aforementioned request signal would be transmitted to the discoverable device (or a computer associated therewith) in one of the way described previously (process action 700). This could be made on a periodic basis or not, and could identify what particular device it is desired to obtain an address for in the request signal.

The discoverable device would reply to the request with a network address (process action 702). The discovering device then starts negotiations for data transmission (e.g., UPnP, T.120, H.323, or web conferencing URL) via a network common to the two devices using the received address (process action 704).

If the foregoing request by the discovering device is general, such that replies from all discoverable devices at the remote site are solicited, then the reply signal would include both the device's network address and its signature. In this way the requesting device can ascertain what type of device is replying, thereby allowing the requesting device to select which device or devices it wants to establish communications with over the local network. If the request was specific as to the type of device, then the reply signal would not need to contain a device signature. However, as before, the mere fact that the request is answered by a device is indicative that the device is present at the remote site and that it is available for communications over a computer network.

2.2.1 Audible and Inaudible Audio Signals

The audio signal transmitted by the discoverable and discovering devices can be an audible audio signal or an inaudible audio signal. An inaudible audio signal is implemented by encoding the desired data (e.g., the device's signature, a request for a network address or the network address itself via a conventional watermark technique. In general, an audio watermark involves altering the frequency spectrum of an audio signal to embed a pattern. This pattern represents the data being encoded. In the context of producing an inaudible watermark encoded audio signal in accordance with the present system and process, the audio signal is low-amplitude noise, which is inaudible to a human, and which has been altered as described above to embed the desired data. These alterations do not change the inaudible nature of the signal. The use of inaudible signals has an advantage of not being a distraction to people at a location in the event the signals are transferred between the communication device to the endpoint component or computing device through the air. This is particularly true in the case of the periodic signal.

As for audible audio signals, these can be implemented using any conventional audio-based encoding method, such as via the use of DTMF or MFSK encoding. An advantage of using an audible signal is that it can have a relatively short duration in comparison to an inaudible signal employing watermarking techniques, even though providing the same amount of embedded data. For example, a typical network address can be encoded in an audible signal with a duration of 320 ms or less depending on the encoding used, whereas it would require an inaudible watermarked signal several seconds to encode the address. In addition, since the audio signals used to request an address and provide one in reply would occur infrequently, they would not present a significant distraction to people in the area even if they were audible. To the contrary, the use of an audible signal to request and provide a network address would alert the user to the fact that communication is being established between two devices. Thus, in one version of the foregoing audio-based discovery techniques, an inaudible periodic audio signal is used to transmit the signature of a discoverable device employing watermarked encoding, while the audio signals used to request a network address and provide the address in reply employ encoded audible signals.

Audio-based discovery has important advantages over standard techniques, such as aforementioned network-based multicast scheme, which solve the problems addressed previously. For instance, the use of the present audio-based discovery techniques does not require any infrastructure changes. For example, as mentioned earlier the multicast feature in many local networks is disabled, which prevents discovery with protocols like UPnP. However, the present audio-based discovery technique allows devices to discover each other's network address, without the use of multicasting over the network. Thus, communication between devices can be established without any change to the network settings. In this way, audio-based discovery can be combined with UPnP to allow UPnP to work even in environments with the multicast feature disabled.

2.2.2 Encrypted Signals

As an added security measure one or more of the signals transmitted by a discoverable discovering device can be encrypted using conventional encryption techniques, such as DES encryption. In this way, the presence of a device at a location and/or its network address could only be ascertained by a device possessing the ability to decrypt the signals. This would allow access to certain devices to be limited to persons previously granted access rights.

Wherefore, what is claimed is:

1. A system for a discovering electronic device to discover the network address of a discoverable electronic device which is connected to the same computer network as the discovering device and which is located at a site remote from the discovering device, comprising:
   a general purpose computing device residing in the discovering electronic device;
   a computer program comprising program modules executable by the general purpose computing device, wherein the computing device is directed by the program modules of the computer program to,
      receive a signature signal initiated by the discoverable electronic device from the site remote from the discovering device, wherein the signal comprises data representing a signature of the discoverable device indicative of its presence at the remote location and its being accessible via the network to which both the discovering electronic device and discoverable electronic device are connected,
      transmit a request signal for receipt by the discoverable electronic device at the site remote from the discovering device whose signature was received which requests the address assigned to that discoverable device on the network to be transmitted to the discovering device, and
      receive a reply signal initiated by the discoverable electronic device from the site remote from the discovering device whose signature was received which comprises data representing the requested network address, wherein the signature, request and reply signals are audio signals that are sent between the discovering and discoverable devices over a communications medium not comprising said network, and wherein
the signature signal initiated by the discoverable electronic device further comprises an indicator indicating the type of electronic device it is, wherein transmitting the request signal is executed only for a discoverable device of the type that it is desired for the discovering device to establish communications with, and wherein the device type ascertained from the indicator included in the signature signal initiated by the discoverable electronic device.

2. The system of claim 1, wherein the communications medium is a telephone communications system, and wherein there is a communications device connected to the telephone communication system at the location where the discovering device resides and where the discoverable device resides.

3. The system of claim 2, wherein the discovering device and the communications device residing at the same location each comprise a microphone and loudspeaker for receiving and transmitting audio signals through the air, and wherein the signature and reply signals initiated by the discoverable device are first received by said communication device and then transmitted via its loudspeaker through the air to the microphone of the discovering device, and wherein the request signal transmitted by the discovering device is transmitted via the discovering device's loudspeaker through the air to the microphone of said communication device where it is received and then transmitted to the discoverable device over the telephone communication system.

4. The system of claim 2, wherein the discovering device and the communications device residing at the same location comprise direct audio connection interfaces for receiving and transmitting audio signals, and wherein the signature and reply signals initiated by the discoverable device are first received by said communication device and then transmitted via its direct audio connection interface to the direct audio connection interface of the discovering device, and wherein the request signal transmitted by the discovering device is transmitted via the discovering device's direct audio connection interface to the direct audio connection interface of said communication device where it is received and then transmitted to the discoverable device over the telephone communication system.

5. The system of claim 2, wherein the discoverable device and the communications device residing at the same location each comprise a loudspeaker and microphone for transmitting and receiving audio signals through the air, and wherein the signature and reply signals initiated by the discoverable device are transmitted via the discoverable device's loudspeaker through the air to the microphone of said communication device where it is received and then transmitted to the discovering device over the telephone communication system, and wherein the request signal transmitted by the discovering device is first received by said communication device and then transmitted via its loudspeaker through the air to the microphone of the discoverable device.

6. The system of claim 2, wherein the discoverable device and the communications device residing at the same location comprise direct audio connection interfaces for respectively transmitting and receiving audio signals, and wherein the signature and reply signals initiated by the discoverable device are transmitted via the discoverable device's direct audio connection interface to the direct audio connection interface of said communication device where it is received and then transmitted to the discovering device over the telephone communication system, and wherein the request signal transmitted by the discovering device is first received by said communication device and then transmitted via its direct audio connection interface to the direct audio connection interface of the discoverable device.

7. The system of claim 1, wherein the signature signal is a low amplitude audio signal inaudible to humans which has the signature of the discoverable electronic device responsible for initiating it embedded therein in the form an audio watermark, and wherein the program module for receiving a signature signal comprises a sub-module for obtaining the discoverable device's signature from the audio watermark.

8. The system of claim 1, wherein the program module for transmitting a request signal comprises a sub-module for generating the request signal in the form of a low amplitude audio signal inaudible to humans which has the address request embedded therein as an audio watermark, such that the discoverable device receiving the request signal obtains the address request from the audio watermark.

9. The system of claim 1, wherein the reply signal is a low amplitude audio signal inaudible to humans which has the data representing the requested network address embedded therein in the form an audio watermark, and wherein the program module for receiving a reply signal comprises a sub-module for obtaining the discoverable devices network address from the audio watermark.

10. The system of claim 1, wherein the signature signal is an audio signal audible to humans which has the signature of the discoverable electronic device responsible for initiating it encoded therein, and wherein the program module for receiving a signature signal comprises a sub-module for decoding the discoverable device's signature from the signature signal.

11. The system of claim 1, wherein the program module for transmitting a request signal comprises a sub-module for generating the request signal in the form of an audio signal audible to humans which has the address request encoded therein, such that the discoverable device receiving the request signal obtains the address request by decoding the request signal.

12. The system of claim 1, wherein the reply signal is an audio signal audible to humans which has the data representing the requested network address encoded therein, and wherein the program module for receiving a reply signal comprises a sub-module for decoding the discoverable device's network address from the reply signal.

13. The system of claim 1, wherein the signature signal is initiated by a discoverable electronic device on a periodic basis.

14. The system of claim 1, wherein the signature signal initiated by a discoverable electronic device is encrypted, and wherein the program module for receiving the signature signal initiated by a discoverable electronic device comprises a sub-module for decrypting the signal.

15. The system of claim 1, wherein the reply signal initiated by a discoverable electronic device is encrypted, and wherein the program module for receiving the reply signal initiated by a discoverable electronic device comprises a sub-module for decrypting the signal.

16. A computer-implemented process for a discovering electronic device to discover the network address of a discoverable electronic device which is connected to the same computer network as the discovering device and which is located at a site remote from the discovering device, to facilitate the transfer of data and other communications over the common network, said process comprising using a computer to perform the following process actions:

the discovering device receiving a signal initiated by the discoverable electronic device from the site remote from the discovering device, wherein the signal comprises data representing the address assigned to the discoverable device on the common network to which both the discovering electronic device and discoverable electronic device are connected, and wherein the signal is an audio signal that is sent between the discovering and discoverable devices over a communications medium not comprising said common network; and the discovering device using the received network address to establish communications via the common network with the discoverable device that initiated the address;
  wherein the signal initiated by the discoverable electronic device further comprises a signature indicating the type of electronic device it is, and inherently indicating its presence at the remote location and its being accessible via said common network, and
  wherein the discovering device using the received network address to establish communications via the common network with the discoverable device that transmitted the address is performed only for a discoverable device of the type that it is desired for the discovering device to establish communications with, wherein the device type is ascertained from the signature included in the signal initiated by the discoverable electronic device.

17. The process of claim 16, wherein the communications medium is a telephone communications system, and wherein there is a communications device connected to the telephone communication system at the location where the discovering device resides and where the discoverable device resides.

18. The process of claim 17, wherein the discovering device and the communications device residing at the same location comprise a microphone and loudspeaker, respectively, for respectively receiving and transmitting audio signals through the air, and wherein the audio signal initiated by the discoverable device is first received by said communication device and then transmitted via its speaker through the air to the microphone of the discovering device.

19. The process of claim 17, wherein the discovering device and the communications device residing at the same location comprise direct audio connection interfaces for respectively receiving and transmitting audio signals, and wherein the audio signal initiated by the discoverable device is first received by said communication device and then transmitted via its direct audio connection interface to the direct audio connection interface of the discovering device.

20. The process of claim 17, wherein the discoverable device and the communications device residing at the same location comprise aloud speaker and microphone, respectively, for respectively transmitting and receiving audio signals through the air, and wherein the audio signal initiated by the discoverable device is transmitted through the air via its loudspeaker to the microphone of said communication device.

21. The process of claim 17, wherein the discoverable device and the communications device residing at the same location comprise direct audio connection interfaces for respectively transmitting and receiving audio signals, and wherein the audio signal initiated by the discoverable device is transmitted via its direct audio connection interface to the direct audio connection interface of said communication device.

22. The process of claim 16, wherein the signal initiated by the discoverable electronic device is a low amplitude audio signal inaudible to humans which has the data representing the address assigned to the discoverable device embedded therein in the form an audio watermark, and wherein the process action of receiving the signal initiated by a discoverable device comprises an action of obtaining the discoverable device's address from the audio watermark.

23. The process of claim 16, wherein the signal initiated by the discoverable electronic device is an audio signal audible to humans which has the data representing the address assigned to the discoverable device encoded therein, and wherein the process action of receiving the signal initiated by a discoverable device comprises an action of decoding the discoverable device's address from the encoded signal.

24. The process of claim 16, wherein the signal initiated by a discoverable electronic device is encrypted, and wherein the process action of the discovering device receiving a signal initiated by a discoverable electronic device comprises an action of decrypting the signal.

25. A system for a discovering electronic device to discover the network address of one or more discoverable electronic devices which are connected to the same network as the discovering device and which are located at a site remote from the discovering device, comprising:
   a general purpose computing device residing in the discovering electronic device;
   a computer program comprising program modules executable by the general purpose computing device, wherein the computing device is directed by the program modules of the computer program to,
      transmit a request signal which requests the network address assigned to a discoverable device located at the site remote from the discovering device be transmitted to the discovering device, and which specifies the type of discoverable electronic device it is desired to obtain the network address for, such that only the discoverable electronic devices of the specified type which are presence in the remote location and accessible via said network initiate a reply signal, and
      receive a reply signal initiated by a discoverable electronic device from the site remote from the discovering device which comprises data representing the requested network address, and a signature indicating the type of electronic device it is so as to inherently indicating its presence in the remote location and its being accessible via said common network thereby allowing the discovering device to determine if it wants to establish communications with the discoverable device over the network, wherein
      the request and reply signals are audio signals that are sent between the discovering and discoverable devices over a communications medium not comprising said network to which both the discovering electronic device and the one or more discoverable electronic devices are connected.

26. The system of claim 25, wherein the communications medium is a telephone communications system, and wherein there is a communications device connected to the telephone communication system at the location where the discovering device resides and where the discoverable devices reside.

27. The system of claim 26, wherein the discovering device and the communications device residing at the same location each comprise a microphone and loudspeaker for receiving and transmitting audio signals through the air, and wherein the reply signal initiated by a discoverable device is first received by said communication device and then transmitted via its loudspeaker through the air to the microphone of the discovering device, and wherein the request signal transmitted by the discovering device is transmitted via the discovering device's loudspeaker through the air to the microphone of said communication device where it is received and then transmitted to the discoverable devices over the telephone communication system.

28. The system of claim 26, wherein the discovering device and the communications device residing at the same location comprise direct audio connection interfaces for receiving and transmitting audio signals, and wherein the reply signal initiated by the discoverable device is first received by said communication device and then transmitted via its direct audio connection interface to the direct audio connection interface of the discovering device, and wherein the request signal transmitted by the discovering device is transmitted via the discovering device's direct audio connection interface to the direct audio connection interface of said communication device where it is received and then transmitted to the discoverable devices over the telephone communication system.

29. The system of claim 26, wherein the discoverable devices and the communications device residing at the same location each comprise a loudspeaker and microphone for transmitting and receiving audio signals through the air, and wherein the reply signals initiated by a discoverable device is transmitted via the discoverable device's loudspeaker through the air to the microphone of said communication device where it is received and then transmitted to the discovering device over the telephone communication system, and wherein the request signal transmitted by the discovering device is first received by said communication device and then transmitted via its loudspeaker through the air to the microphones of the discoverable devices.

30. The system of claim 26, wherein the discoverable devices and the communications device residing at the same location comprise direct audio connection interfaces for respectively transmitting and receiving audio signals, and wherein the reply signal initiated by a discoverable device is transmitted via the discoverable device's direct audio connection interface to the direct audio connection interface of said communication device where it is received and then transmitted to the discovering device over the telephone communication system, and wherein the request signal transmitted by the discovering device is first received by said communication device and then transmitted via its direct audio connection interface to the direct audio connection interfaces of the discoverable devices.

31. The system of claim 25, wherein the program module for transmitting a request signal comprises a sub-module for generating the request signal in the form of a low amplitude audio signal inaudible to humans which has the address request embedded therein as an audio watermark, such that a discoverable device receiving the request signal obtains the address request from the audio watermark.

32. The system of claim 25, wherein the reply signal is a low amplitude audio signal inaudible to humans which has the data representing the requested network address embedded therein in the form an audio watermark, and wherein the program module for receiving a reply signal comprises a sub-module for obtaining a discoverable device's network address from the audio watermark.

33. The system of claim 25, wherein the program module for transmitting a request signal comprises a sub-module for generating the request signal in the form of an audio signal audible to humans which has the address request encoded therein, such that a discoverable device receiving the request signal obtains the address request by decoding the request signal.

34. The system of claim 25, wherein the reply signal is an audio signal audible to humans which has the data representing the requested network address encoded therein, and wherein the program module for receiving a reply signal comprises a sub-module for decoding a discoverable device's network address from the reply signal.

35. The system of claim 25, wherein the request signal is transmitted on a periodic basis.

36. The system of claim 25, wherein the reply signal initiated by a discoverable electronic device is encrypted, and wherein the program module for receiving the reply signal initiated by a discoverable electronic device comprises a sub-module for decrypting the signal.

37. A computer-readable storage medium having computer-executable instructions stored thereon for performing the process actions recited in claim 16.

38. A computer-readable storage medium having computer-executable instructions stored thereon for performing the process actions recited in claim 25.

* * * * *